Oct. 10, 1944.    C. H. WHITE    2,360,028
PLANTER
Filed April 25, 1942
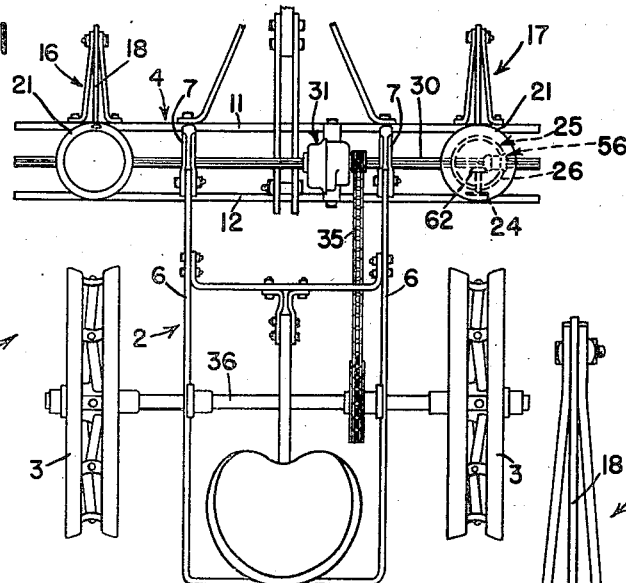
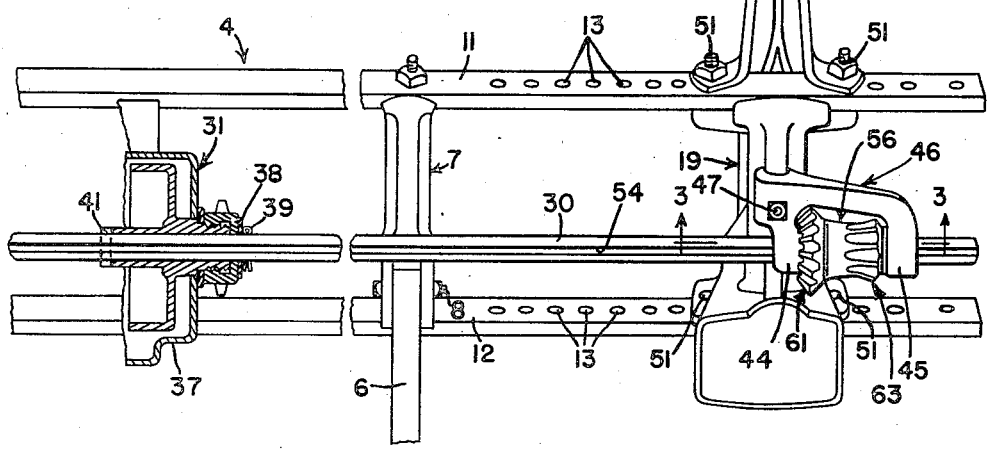
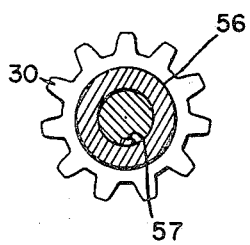
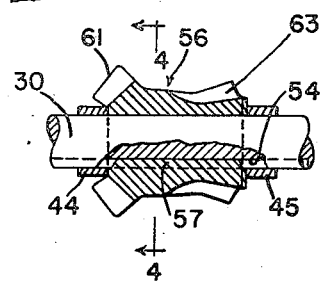
INVENTOR
Charles H. White
BY
ATTORNEYS Patented Oct. 10, 1944

2,360,028

UNITED STATES PATENT OFFICE 2,360,028

PLANTER

Charles H. White, Moline, Ill., assignor to Deere & Company, Moline, Ill., a corporation of Illinois Application April 25, 1942, Serial No. 440,500

6 Claims. (Cl. 111—69)

The present invention relates generally to planting implements and more particularly to two row planters in which means is provided for changing the spacing between the rows.

The object and general nature of the present invention is the provision of an improved planter in which the driving connection between the drill shaft of the planter and the seeding mechanisms of the hoppers is simplified and so constructed and arranged to accommodate movement of the hoppers and furrow openers to different positions, according to the desired row spacing. More particularly, it is a feature of this invention to provide the runner frame with a drill shaft that is held against lateral or axial displacement and to provide a slidable but non-rotatable connection between the drill shaft and the gear on the latter that drives the seeding mechanism, the gear being shiftable with the furrow opener and seeding unit when the latter is shifted along the runner frame to vary the row spacing. Another feature of this invention is the provision of means on the furrow opener unit for receiving the drill shaft, said means being constructed to receive the gear on the drill shaft that drives the seeding mechanism so that as the furrow opener unit is shifted relative to the runner frame the gear is likewise moved along the shaft as the furrow opener unit is adjusted, there being a slidable but non-rotatable connection between the drill shaft and the gear member whereby the latter is always rotatable with the shaft but may be shifted longitudinally thereof at any time.

These and other objects and advantages of the present invention will be apparent to those skilled in the art after a consideration of the following detailed description, taken in conjunction with the accompanying drawing in which the preferred structure has been illustrated.

In the drawing:

Figure 1 is a plan view of a planter in which the principles of the present invention have been incorporated;

Figure 2 is a fragmentary enlarged perspective view illustrating the manner that the seeding gear is mounted on the drill shaft but slides with the furrow opener unit relative to the planter runner frame and the drill shaft when adjusting the furrow opener unit for different row spacing; and Figures 3 and 4 are sectional views taken generally along the lines 3—3 and 4—4, respectively, of Figure 2.

Referring now to the drawing, more particularly Figure 1, the reference numeral 1 indicates the planter in its entirety which, for convenience of illustration, has been shown as a two-row horse drawn planter incorporating a main frame 2 supported on ground wheels 3 and a runner or furrow opener frame 4 disposed generally transversely of the implement and pivoted to the forward ends of a pair of bars 6 which form a part of the main frame 2. Preferably, the pivotal connection comprises a pair of brackets 7 fixed to the runner frame 4 and each carrying a pivot pin 8 to which the front end of the associated frame bar 6 is connected. This construction is largely conventional and is quite similar to that shown in my prior Patent Re. 21,949, dated November 18, 1941.

The runner frame 4 comprises two parallel transversely extending bars 11 and 12, each of which is provided with a plurality of openings 13 adjacent the laterally outer ends of the runner frame bars. The runner frame 4 receives two furrow opener units 16 and 17 which preferably are identical and one of which is shown in somewhat more detail in Figure 2. Each furrow opener unit includes a runner shoe 18 which is secured to a shank 19 that extends generally vertically between the runner frame bars 11 and 12. The shank 19 is hollow and includes a seed passage leading down to the furrow opened by the runner shoe 18, as in conventional practice. The upper end of the shank of each of the units 16 and 17 receives a hopper 21 in the lower portion of which conventional seed selecting and distributing mechanism is disposed. In the planter chosen to illustrate the present invention, the seed selecting mechanism is of the type shown in the patent to C. E. White, No. 1,512,256, dated October 21, 1924, which is particularly constructed to handle either corn or cotton. For handling cotton the seeding mechanism includes a picker wheel 24 and for handling corn the seeding mechanism includes a seed plate 25 which is provided with a gear 26 by which the plate may be driven.

For driving the seed selecting mechanisms of the two furrow opener units 16 and 17, the planter 1 includes a drill shaft 30 that extends transversely of the runner frame 4, passing through a suitable clutch mechanism indicated in its entirety by the reference numeral 31 and which may be similar to that shown in my prior Patent 2,147,726, dated February 21, 1939. The clutch mechanism 31 includes means for throwing the planting mechanism into and out of gear and also selects the desired gear ratio for driving the drill shaft 30. The drive is preferably through a chain 35 which is connected to a sprocket on the axle 36 to which the ground wheels 3 are connected. The present invention is not concerned with the particular details of the clutch mechanism or the gear change mechanism incorporated therein, but it is to be noted from Figure 2 that the drill shaft 30 extends through the clutch housing 37 and is held against lateral displacement in one direction by means of a thrust washer 38 and a cotter 39, both disposed on the outside of the housing at one side of the sprocket receiving the chain 35. The drill shaft 30 is held against displacement in the other direction by a pin 41 on the inside of the clutch housing.

As best shown in Figure 2, the laterally outer end of the drill shaft 30 at the right side of the planter is received in two arms 44 and 45 that form a part of a drill shaft bearing 46 which is connected, as by a bolt 47, to the upper end of the runner shank 19. The runner shank is secured to the bars 11 and 12 by bolt means 51 which may be disposed in different holes 13, according to the desired row spacing. The supporting means for the other end of the drill shaft 30 is substantially identical with that just described, except that certain of the parts are left hand parts instead of right hand, and hence a further description is unnecessary. The drill shaft 30 is provided with a keyway 54 at each end, but if desired the keyway may extend the entire length of the shaft. A drive gear pinion 56 for each of the hopper seeding mechanisms is mounted on the associated end of the drill shaft and is disposed between the two bearing arms 44 and 45 of the associated drill shaft bearing member 46. The bearing arms 44 and 45 are spaced apart a distance sufficient to receive the gear member 56 therebetween but are constructed to prevent any axial displacement of the gear member 56 relative to the associated runner shank. Each gear member 56 is provided with a key 57 which may, if desired, be a separate part but which preferably is cast on the associated pinion 56. The key 57 extends into the keyway 54 and serves to cause the drill shaft 30 to drive the pinion 56, but the latter is slidable along the drill shaft 30 whenever the bolts 51 are loosened or removed and the runner shank 19 adjusted along the runner frame bars 11 and 12 to change the row spacing. In other words, to change the row spacing all that it is necessary to do is to readjust the runner shanks 19, since the pinions 56 merely slide along the drill shaft 30 without requiring the loosening of any set screws or other means clamping the pinions to the drill shaft. Thus, it is extremely simple to change the row widths since the drive pinions move with the shanks, the drill shaft bearing bracket 46 always retaining the associated pinion 56 in the proper position. As is indicated in Figure 1, the pinion 56 includes one bevel gear section 61 which meshes with a gear 62 that drives the cotton picker wheel 24, and each of the pinions 56 include a second gear section 63 which meshes with the corn plate drive gear 26. Since each pinion 56 is held in constant relation with the hopper seeding mechanism, regardless of the position of the runner shank along the bars 11 and 12 of the runner frame, the pinions 56 are always correctly located with relation to the hopper parts.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A planter having a furrow opener frame, a pair of furrow opener shanks shiftably connected with the frame and adjustable to adjust the row width, a seed hopper carried on each shank and including seeding mechanism, a drill shaft on said frame, a pair of pinions slidable but non-rotatable on said drill shaft for driving the seeding mechanism of each hopper, and means on each shank engageable with one side of one pinion and the other side of the other pinion for sliding said pinions along the drill shaft when the shank is adjusted along the frame.

2. In a planter having a furrow opener frame, a laterally shiftable furrow opener shank and a drill shaft held against axial displacement relative to said frame, a pinion member slidably but non-rotatably mounted on said shaft, a yoke separate from said shank and having arms embracing said pinion member, and means securing said yoke to said shank.

3. In a planter having a furrow opener frame, a laterally shiftable furrow opener shank and a drill shaft held against axial displacement relative to said frame, a pinion member slidably but non-rotatably mounted on said shaft, said pinion member having a picker-wheel driving section and a seed plate driving section, and a yoke secured to said shank and having arms embracing said pinion member at opposite ends thereof, one of said arms being disposed adjacent the central plane of said shank and engaging one end of the picker-wheel driving pinion section and the other arm disposed at one side of said central plane and engaging the outer end of the seed plate driving pinion section.

4. A planter having a furrow opener frame, a furrow opener shank shiftably connnected with the frame, a seed hopper carried on said shank and including seeding mechanism, a drill shaft on said frame, a pair of pinions slidable but non-rotatable on said drill shaft for driving the seeding mechanism of said hopper, and means on said shank engageable with one side of one pinion and the other side of the other pinion for sliding said pinions along the drill shaft when the shank is adjusted along the frame.

5. A planter as defined in claim 4, further characterized by said pinions constituting one integral part.

6. In a planter having a furrow opener frame, a laterally shiftable furrow opener shank and a drill shaft held against axial displacement relative to said frame, a pinion member slidably but non-rotatably mounted on said shaft, and means on said shank and movable with the latter when the shank is shifted relative to said frame and including portions embracing at least a part of said pinion member for sliding the latter along said drill shaft when the shank is shifted.

CHARLES H. WHITE.